United States Patent [19]
Kalm et al.

[11] Patent Number: 5,582,286
[45] Date of Patent: Dec. 10, 1996

[54] MODULAR POWER ROLLER CONVEYOR

[75] Inventors: W. Scott Kalm, Carrollton; Morteza M. Langroodi, Arlington; Keith Corrigan, Mansfield, all of Tex.

[73] Assignee: ElectroCom Automation, L.P., Arlington, Tex.

[21] Appl. No.: 331,063

[22] Filed: Oct. 28, 1994

[51] Int. Cl.⁶ .................................................. B65G 13/06
[52] U.S. Cl. ................................ 198/781.06; 198/860.3
[58] Field of Search ...................... 198/781.06, 781.09, 198/781.1, 860.3

[56] References Cited

U.S. PATENT DOCUMENTS

| | | | |
|---|---|---|---|
| 4,982,835 | 1/1991 | Butler et al. | 198/860.3 |
| 5,060,785 | 10/1991 | Garrity | 198/781.06 |
| 5,086,910 | 2/1992 | Terpstra | 198/781.06 |
| 5,201,397 | 4/1993 | Isaacs | 198/781.06 |
| 5,285,887 | 2/1994 | Hall | 198/781.06 |
| 5,423,418 | 6/1995 | Furrow | 198/860.3 |

OTHER PUBLICATIONS

*ITOH Power Moller*, Somfy Systems, Inc., Cranbury, N.J., Jan. 1993. A brochure describing internally motorized conveyor rollers.

*Interroll, The Driving Force, Introducing Intelliveyor*, Interroll Corp., Wilmington, North Carolina, publication date not given. A brochure desciribing an electric conveyor control module.

*Interroll Meca*, Interroll Corp., Wilmington, North Carolina, 1992. A Brochure describing an electric conveyor roller.

*Primary Examiner*—Joseph E. Valenza
*Attorney, Agent, or Firm*—Harold E. Meier

[57] ABSTRACT

A modular power roller conveyor is described having a conveyor section for transporting a product unit. The conveyor section comprises a number of active zones, each active zone containing means for sensing the entry of a product unit into the active zone. A programmable controller generates activation signals to a drive roller in response to the means for sensing. A plurality of carrier rollers are slaved to the drive roller within the active zone such that activation of the drive roller actuates all of the carrier rollers to drive the product unit through the active zone and into the next active zone. The programmable controller also generates a deactuation signal to deactivate the active zone as a product unit exits the zone.

13 Claims, 10 Drawing Sheets

MODULAR POWER ROLLER CONVEYOR

TECHNICAL FIELD

The present invention relates to a conveyor systems and more particularly to a modular conveyor system and a method for conveyor operation.

BACKGROUND OF THE INVENTION

The movement of large numbers of product units, such as a tray or pallet, around a manufacturing or processing facility has long proved to be an expensive and time consuming task. Presently, most systems for carrying out the movement of product units around a manufacturing facility utilize static systems that are set up to maintain and transport product units using a particular configuration that is not easily changed. The problem with these type of systems is that manufacturing or processing requirements may change and reconfiguration of the static system is not easily achieved. Thus, weeks or even months may be required to reconfigure a conveyor system to meet the changing needs of the facility.

Prior art conveyor systems have many problems relating to the maintenance and complexity of the systems. One problem with existing conveyor systems is that the systems normally have complex mechanical gearing consisting of a large number of components. This type of mechanically geared conveyor system requires a great deal of maintenance in order to keep the system in peak operating condition. Air pressure operated systems require a complex pneumatic system in order to operate the conveyor. Pneumatic systems require labor intensive maintenance procedures in order to achieve peak operating conditions of the system. Existing systems also create a great deal of noise when operating. Mechanically geared systems normally comprise a large number of chain and roller drive assemblies creating mechanical noise during operation. Pneumatic systems necessarily require the use of noisy compressors and air injection procedures which add to the noise pollution of the work environment. Finally, each of the above described systems require a great deal of power to operate since the entire system must function at the same time, no matter how many or few product units are present upon the conveyor system at any particular time.

Therefore, a conveyor system is needed which will allow a manufacturing or processing facility to quickly and easily reconfigure the system to changing facility needs, provide easy maintenance requirements, decrease the amount of noise pollution to the work environment, and provide lower energy consumption than is possible with presently existing systems.

SUMMARY OF THE INVENTION

The present invention overcomes the foregoing and other problems with a modular power roller conveyor system and onboard PLC/power card. The system consists of modular Units having a frame for holding a plurality of carrier and drive rollers. These modular units are easily connected to form an adaptable conveyor system. The conveyor section of each module is divided into a number of active zones. Each active zone contains a photosensor and reflector pair for detecting the entry of a product unit into the active zone, a drive roller for driving rollers within the active zone, and a plurality of carrier rollers actuated in response to movement of the drive roller. Each zone is connected to a PLC/power card. Upon detection of a product unit by a photosensor, a control unit generates an activation signal to the drive roller of the active zone the product unit is entering. The drive roller drives the carrier rollers within the active zone allowing the product unit to be transported through the active zone and into the next active zone. At the same time, the controller generates a deactivation signal to the drive roller of the active zone the product unit is exiting to conserve system power.

DETAILED DESCRIPTION

Figures 1, 2:
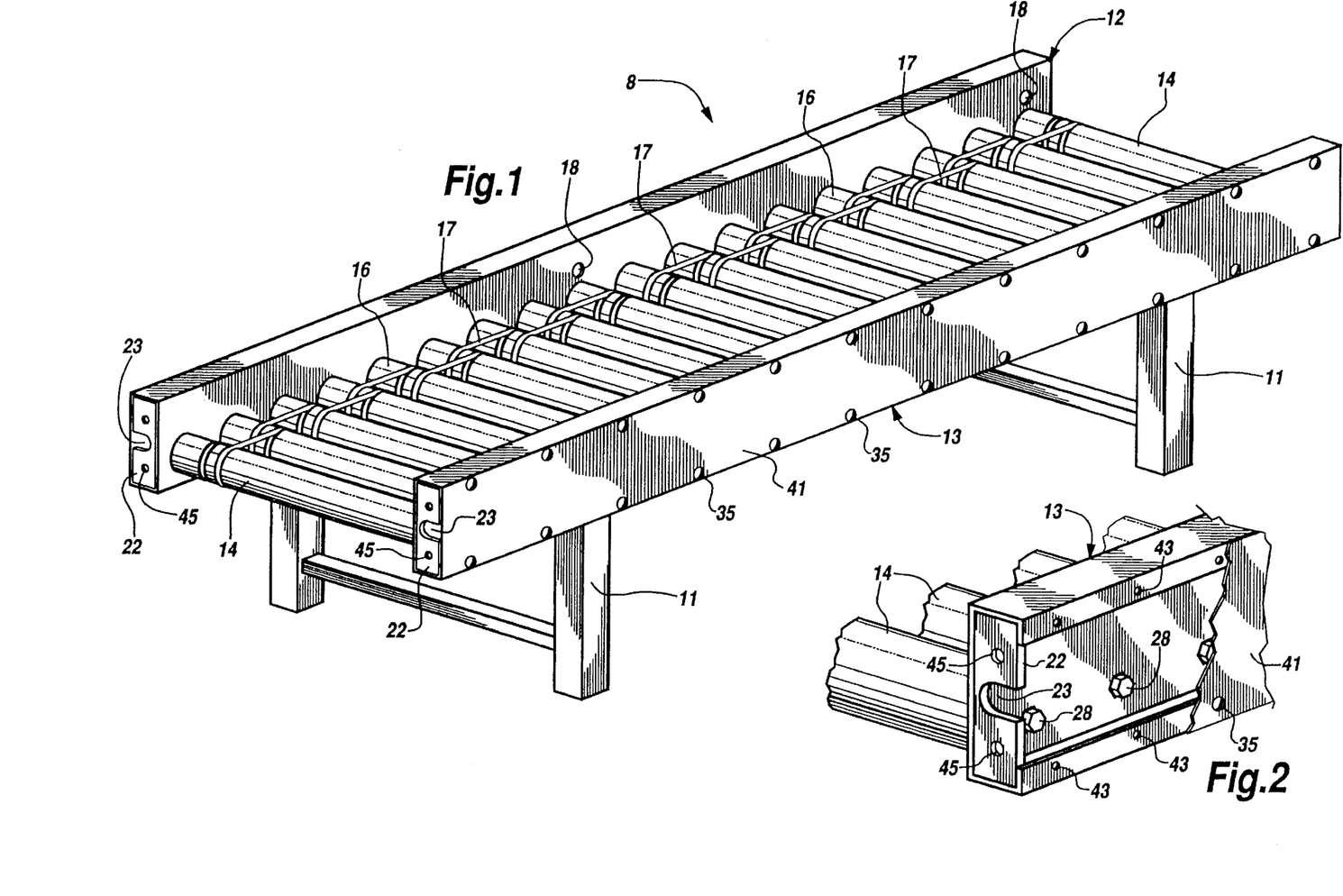
FIG. 1 is a perspective view of one section of the modular power roller conveyor of the present invention.
FIG. 2 is a cut-away representation of one side rail and several rollers of the section of FIG. 1 and the internal connecting brackets.

Referring now to the Drawings, and more particularly to FIG. 1, there is illustrated a perspective view of one embodiment of a module 8 for the modular power roller conveyor of the present invention. The module 8 is a straight conveyor section 10 for transporting received product units. The straight conveyor section 10 is supported by legs 11 and consists of a left side rail 12, a right side rail 13, a plurality of carrier rollers 14 and drive rollers 16 mounted between the left side rail 12 and the right side rail 13. The drive rollers and the carrier rollers may be of the type manufactured by Interroll Corporation and identified as model Driverroll. The carrier rollers 14 and drive rollers 16 are interconnected by a plurality of O-ring bands 17 such that actuation of a drive roller will cause actuation of any carrier rollers connected thereto.

The side rails 12 and 13 have a cross-sectional shape that defines an interior chamber for placement of a controller (FIG. 16) and control wiring (not shown). Openings 18 within side rails 12 and 13 facilitate operation of a plurality of photosensors 34 and reflectors 36 (FIG. 4) for sensing the presence of product units on the straight conveyor section 10. Mounted to the side rails 12 and 13 at each end of the straight conveyor section 10 are internal connecting brackets 22 with holes 45 for bolts and nuts to enable the straight conveyor section 10 to be interconnected with another module 8 and form a conveyor system. An electrical connector mounted in an opening 23 enables a module 8 to be electrically connected to other modules or to a power supply.

Referring now to FIG. 2, there is shown a cut-away representation of the side rail 13 and several rollers 14 and the internal connecting bracket 22. Holes 45 in the connecting bracket 22 allow structural connection with an adjoining module 8, while an opening 23 in the internal connecting bracket 22 allows wire connection between electronic components of adjacent modules 8. A cover 41 protects the wireway, and is connected to side rail 13 with single-turn screws 35 and rifled holes 43. The shafts on which the rollers 14 and 16 turn are spring loaded at one end 28, and the spring loaded end passes through holes in the side rail 13.

Figure 3:
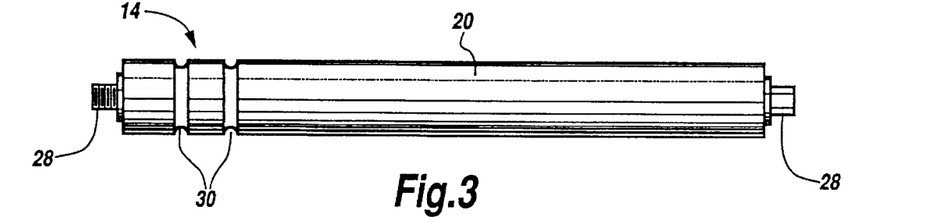
FIG. 3 is a side view of one of the carrier rollers.
Figure 4:
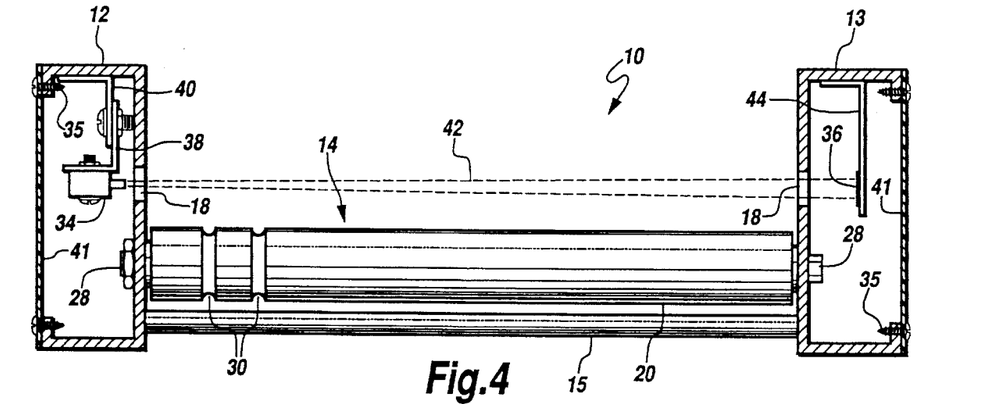
FIG. 4 is a lateral cross-section view of the conveyor section of FIG. 1.

Referring now to FIG. 3 and FIG. 4, there is shown a side view of one of a carrier roller 14. The carrier roller surface 20 is preferably fabricated from a galvanized steel tube. The shafts 28 of the carrier roller 14 are spring loaded at each end allowing for easy removal and mounting of the carrier roller within the side rails 12 and 13. Each carrier roller 14 also includes a pair of grooved channels 30 for placement of the O-ring bands 17 (FIG. 1) between adjacent carrier rollers. Each drive roller 16 has an outward appearance similar to that of the carrier rollers 14. The drive roller 16 has a roller Surface 26, spring loaded shaft 28 on one side and a lock nut and a full nut on the opposite side, and groove channels 30. However, the drive rollers 16 further include internal gearing and an electric motor. The drive rollers 16 are preferably twenty-four volt electric conveyor rollers manufactured by the Interroll Corporation.

Referring to FIG. 4, there is shown a lateral cross-section view of the conveyor section 10 more fully illustrating the placement and operation of the photosensors 34 and reflectors 36 mounted along the conveyor section 10. The photosensor 34 is mounted to a lower sensor bracket 38. Lower sensor bracket 38 connects to an upper sensor bracket 40 which connects to the upper surface of left side rail 12. The assembly is positioned in such a manner that a beam 42 from photosensor 34 is passes through opening 18 within left side rail 12. The beam 42 passes laterally across the conveyor section 10 and passes through opening 18 in the right side rail 13 to strike reflector 36 and is reflected back to sensor 34 where the reflected beam is detected. The reflector 36 is mounted to the interior of the right side rail 13 by a reflector bracket 44.

Figure 5:
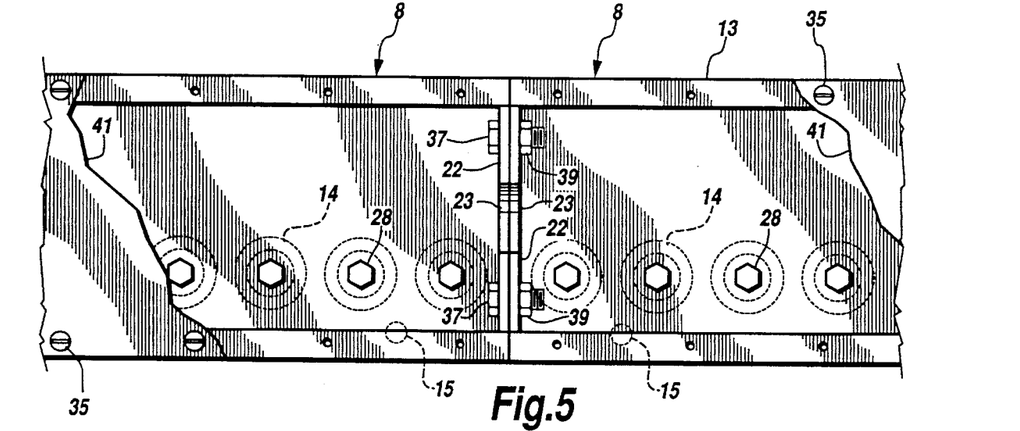
FIG. 5 is a lateral view of the interface between adjacent sections showing the attachment of the roller shafts to the side rail.

Referring to FIG. 5, there is shown a lateral view of the interface between adjacent modules with the bolts 28 attaching the shafts of rollers 14 to the side rail 13. A connecting bracket 22 is shown connecting adjacent modules 8 by means of bolts 37 and nuts 39. Electrical connection is made by means of connectors (not shown) mounted to openings 23. The cover 41 is attached at several points 35.

Figure 6:
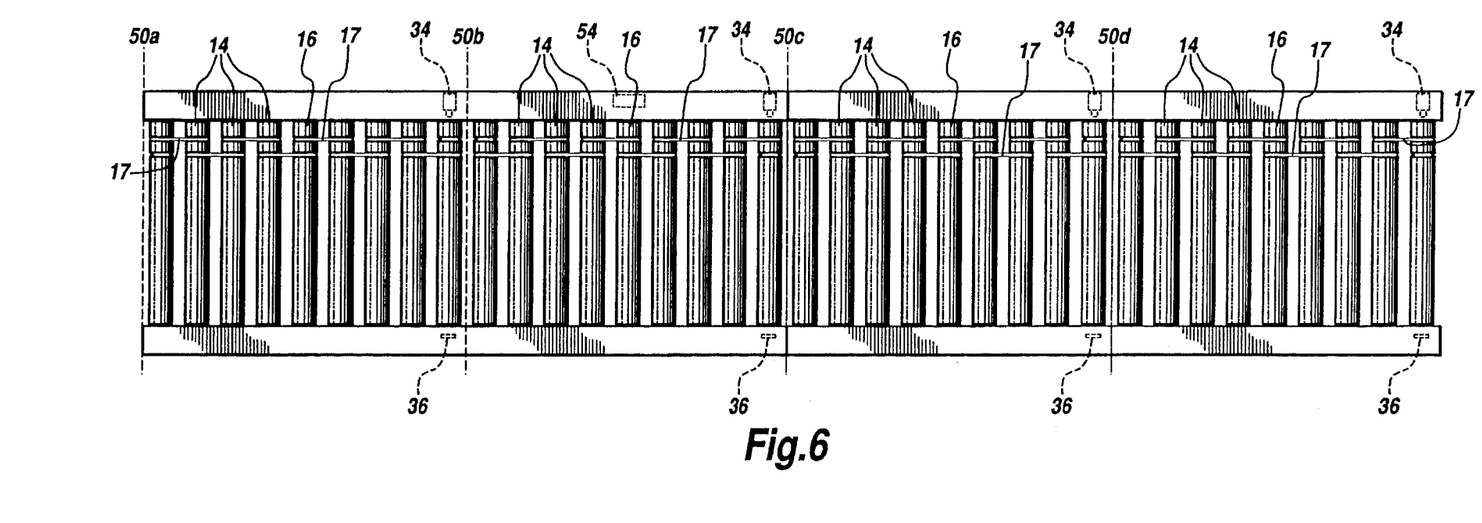
FIG. 6 is a top view of the straight conveyor section of FIG. 1 comprised of four active zone.

Referring now to FIG. 6, there is illustrated a top view of a straight conveyor section including four active zone areas 50a–50d. Each active zone includes a drive roller 16 and plurality of carrier rollers 14 slaved to the drive roller by O-ring bands 17. Also included within each active zone 50 is a photosensor 34 and a reflector 36 located prior to the entry end 52 of the active zone. A programmable controller 54 (FIG. 16) is mounted in the left side rail 12 and is in communication with each drive roller 16, the plurality of photosensors 34 and programmable controllers (FIG. 16) in adjacent conveyor sections.

As a product unit leaves one active zone 50a, the product unit breaks the light beam 42 (FIG. 4) between photosensor 34 and reflector 36. This causes a detection signal to be transmitted to the controller 54 (FIG. 16) by the photosensor 34. For example, upon receipt of a detection signal from the active zone 50b, the controller 54 (FIG. 16) generates an activation signal to the drive roller 16 of the active zone 50b as the product unit is entering the zone. Activation of the drive roller 16 initiates movement of the drive roller and all slaved carrier rollers 14. At the same time, a deactivation signal is transmitted to the drive roller 14 of the active zone 50a as the product unit is exiting this zone. This process continues as the product unit passes from one active zone 50 to another. It is important to note that the drive roller 16 of an active zone 50 is only activated while a product unit moves through the active zone. When a product unit leaves an active zone 50 and no other product units enter the active zone, the drive roller 16 and slaved carrier rollers 14 are not actuated. This results in a conveyor system that uses less power and produces less noise than presently existing systems.

Figure 7:
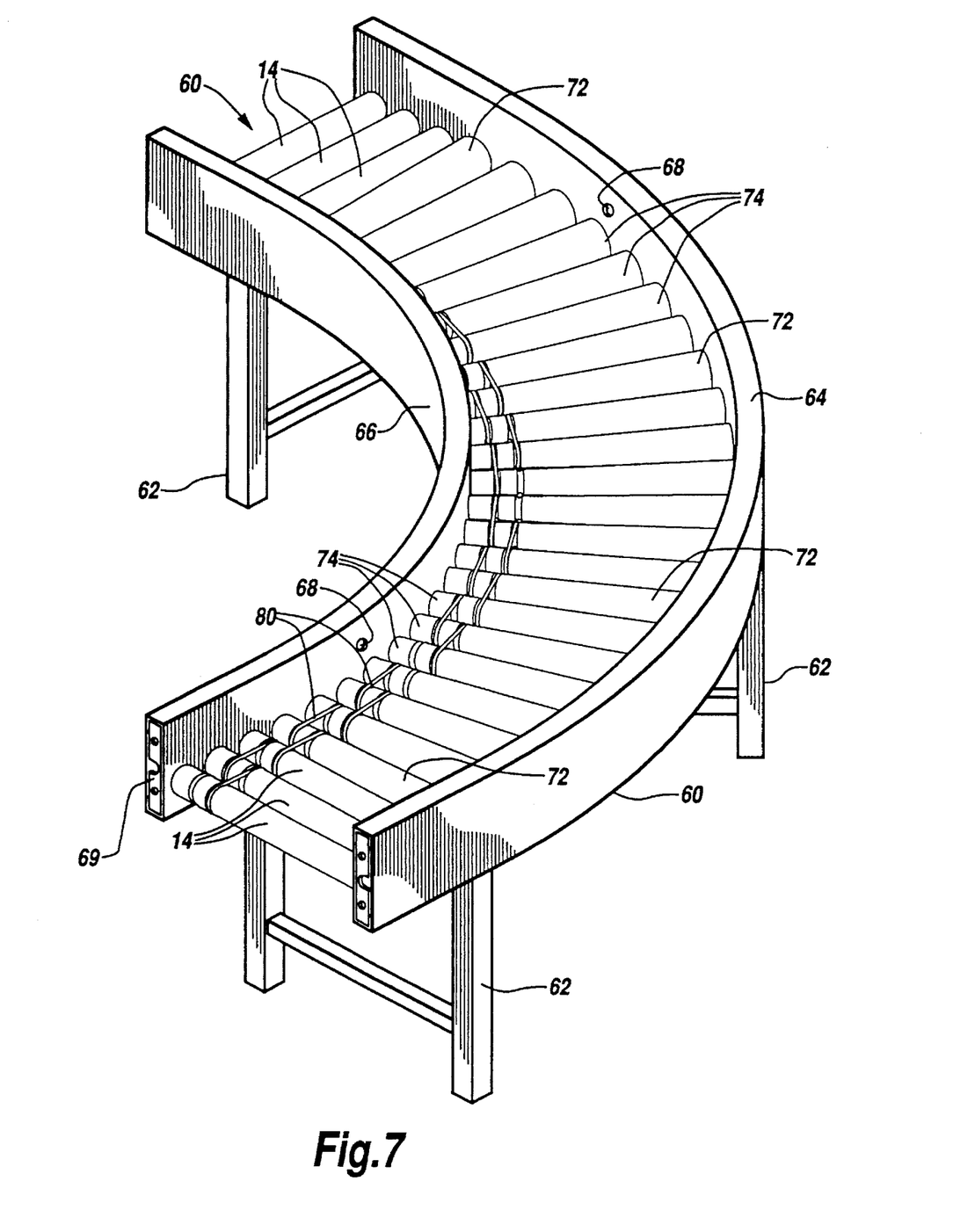
FIG. 7 is a perspective view of a curved conveyor section of the modular power roller conveyor of the present invention.

Referring now to FIG. 7, there is shown curved section of the modular power roller conveyor of the present invention. The module of FIG. 7 comprises a curved conveyor section 60 that change the direction of travel of a product unit by 90°. It is important to note that while this particular module illustrates a 90° turn, a turn from anywhere between 0° and 180° may be constructed. The curved conveyor section 60 is supported by legs 62. As before, the curved conveyor section 60 comprises a left side rail 64, a right side rail 66, drive rollers 72 and carrier rollers (14, 74) mounted between the left side rail 64 and the right side rail 66. The carrier rollers 74 are connected to the drive roller 72 by a plurality of O-ring bands 80 such that actuation of a drive roller will actuate any carrier rollers connected thereto.

Openings 68 within side rails 64 and 66 facilitate operation of photosensors 34 (FIG. 4) and reflectors 36 (FIG. 4). The photosensor and reflector assemblies are mounted in a manner similar to that discussed with respect to FIG. 3. At each end of the curved conveyor section 60 connecting brackets 68 are mounted to the left and right side rails 62 and 64 to interconnect the curved conveyor section 60 to other conveyor sections. Each end of the curved conveyor section 60 also includes a electrical connector mounted in an opening 69 for electrical connection between adjacent modules or a power supply.

Figure 8:
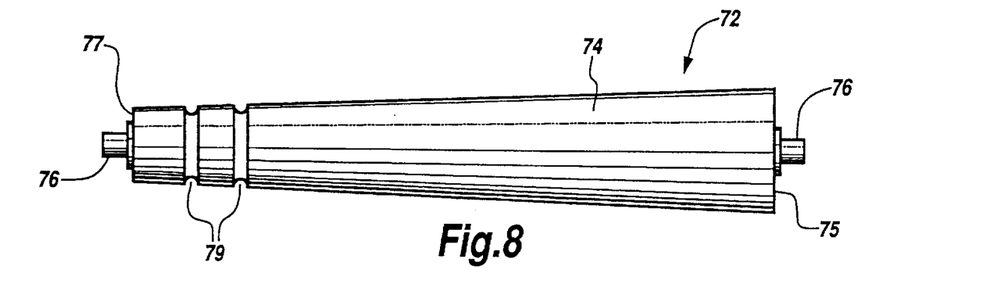
FIG. 8 is a top view of the curved conveyor section of the power roller module as shown in FIG. 7.

Referring now to FIG. 8, there is illustrated the tapered carrier roller 72 of the curved conveyor section 60. The carrier rollers 14 on the straight portions of the curved conveyor section 60 are the same as those discussed with respect to FIG. 3. On the tapered carrier roller 72, the carrier roller surface is preferably fabricated from galvanized steel tubing overlain with high impact molded copolymer segments. The surface forms a continuous taper from a large diameter end 75 to a small diameter end 77 to allow efficient movement of a product unit around the curved section.

Spring loaded shafts 76 allow for mounting and removal of the tapered carrier roller 72 within the left and right side frames 64 and 66. The tapered carrier rollers 72 are mounted such that the small diameter end 77 is placed upon the interior radius of the curved conveyor section 60. Grooved channels 79 allow for placement of O-ring bands 80 (FIG. 7) between adjacent rollers. Drive rollers 72 have a similar appearance to the carrier rollers and are preferably twenty-four volt electric conveyor rollers as manufactured by the Interroll Corporation.

Figure 9:
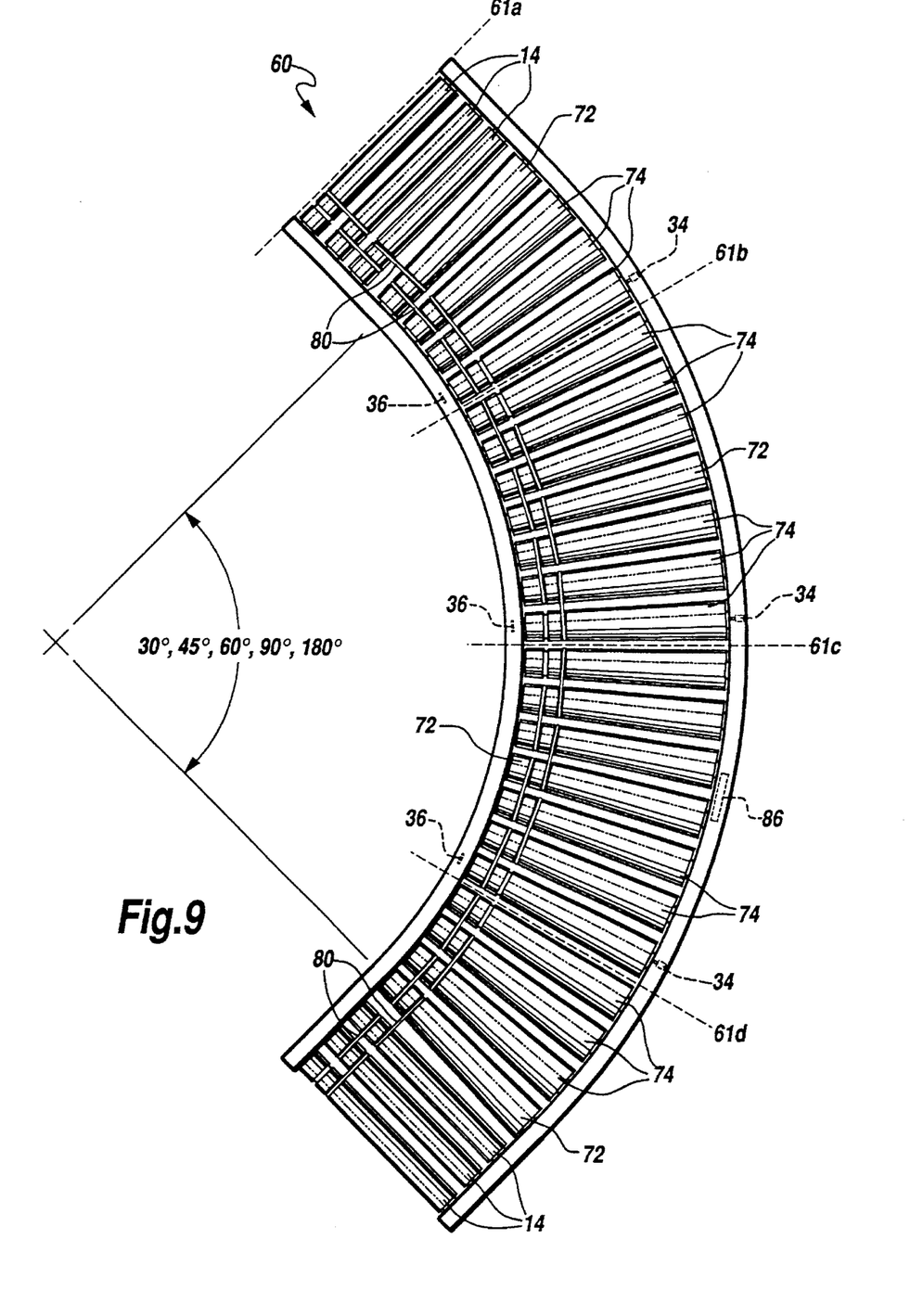
FIG. 9 is the tapered carrier roller of the curved conveyor section.
Figure 16:
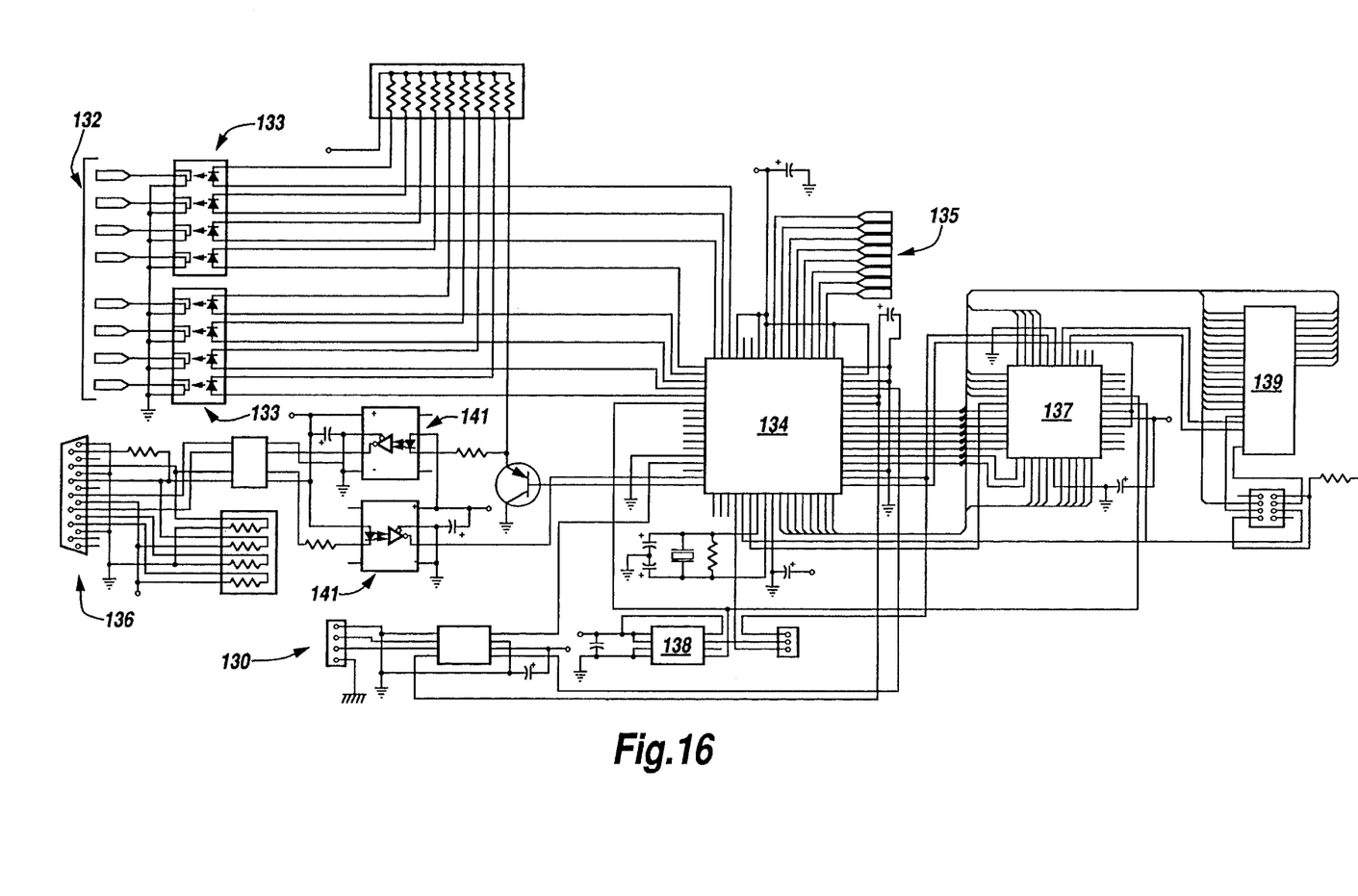
FIG. 16 is a circuit wiring diagram of the controller.

Referring to FIG. 9, there is illustrated a top view of the curved conveyor section 60 of the curved section module. The conveyor section 60 comprises a number of active zones 61a–61d. As a product unit passes between a photosensor 34 and reflector 36 and into an active zone 61b, the photosensor 34 transmits a detection signal to a controller 86 (FIG. 16). In response to the detection signal, the programmable controller 86 (FIG. 16) generates an activation signal to the drive roller 72 of the active zone 61b. The drive roller 72 drives each of the slaved carrier rollers 74 within the active zone 61b until the product unit passes to the active zone 61c. The detection signal also causes the controller 86 (FIG. 16) to generate a deactivation signal to the drive roller 72 of the active zone 61a as the product unit is exiting this zone.

Figure 10:
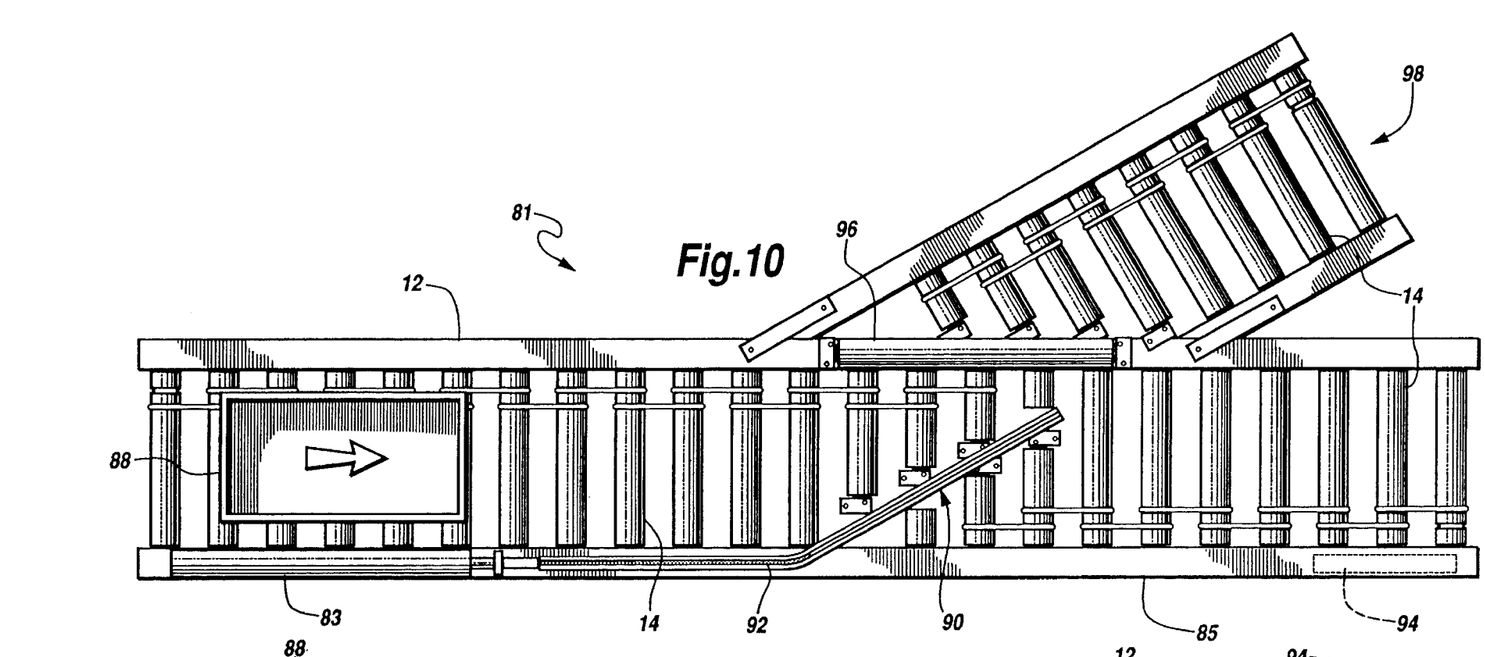
FIG. 10 is a top-view of a left-hand divert section of the power roller module.
Figure 11:
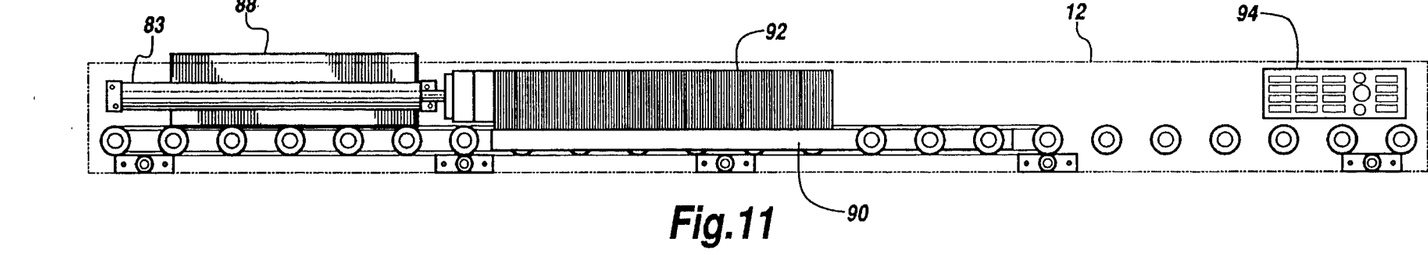
FIG. 11 is a lateral view of a left-hand divert section of FIG. 10 of the power roller module.

Referring to FIG. 10 and FIG. 11, there is illustrated a top-view and a side view of a left-hand divert section 81 of a power roller conveyor. A flexible divert arm 92 is mounted to a side rail 85. A programmable controller 87 (FIG. 16) actuates an air cylinder 83 mounted to the side rail 85 and the extension of the plunger arm within the cylinder 83 extends the flexible divert arm 92 from the side rail 85 across the divert section 81. A track 90 in the plane defined by the surface of the rollers, comprises a narrow groove that serves as a guide for the flexible divert arm 92. The track extends obliquely from the side rail 85, to the limit of extension of the flexible divert arm 92. When the cylinder 83 is actuated, the divert arm 92 slides along the side rail 85 and along the track 90, into the path of product units 88 moving along the conveyor. The bottom edge of the divert arm 92 lies within the groove of the track 90 and as product units pass along the conveyor 81 the divert arm 92 is encountered and slides along the divert arm. Positioned at an angle with reference to the divert section 81 is a straight section 98, and product units that encounter the divert arm 92 slide along the divert arm into the straight section 98 of power roller conveyor.

In a left-hand divert as shown in FIG. 10 the divert arm extends from the side rail 85, but right-hand divert sections are also available, in which the divert arm 92 extends from the opposite side rail. Also available are dual divert sections in which a divert arm 92 extends from each side rail, and a track 90 extends from each side rail, so that product unit may be diverted to the left, to the right, or move straight ahead according to instructions from the programmable controller 94 (FIG. 16).

An alternative embodiment of the invention includes a right angle transfer arm that moves up from below the surface defined by the rollers. The right angle transfer arm is raised by instruction from the programmable controller 94 (FIG. 16).

Figure 12:
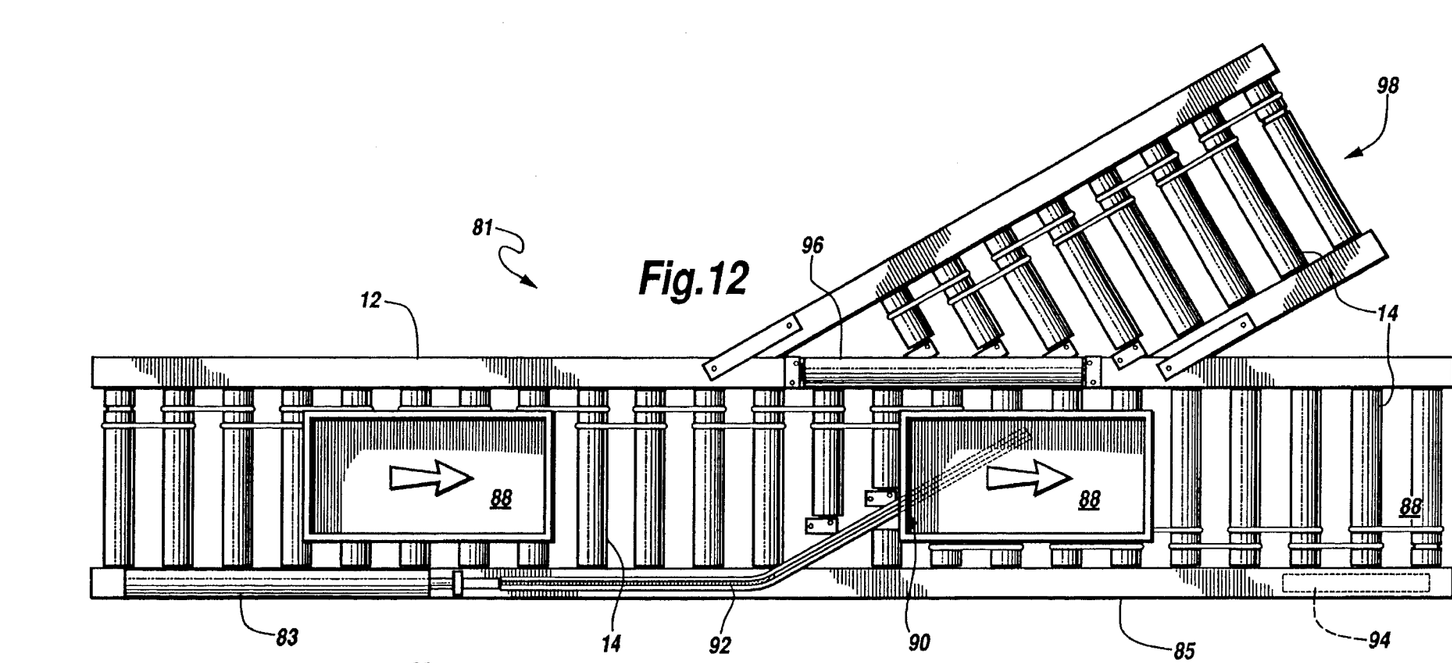
FIG. 12 is a top view of a divert section in which the divert arm is unactuated and positioned above the side rail.
Figure 13:
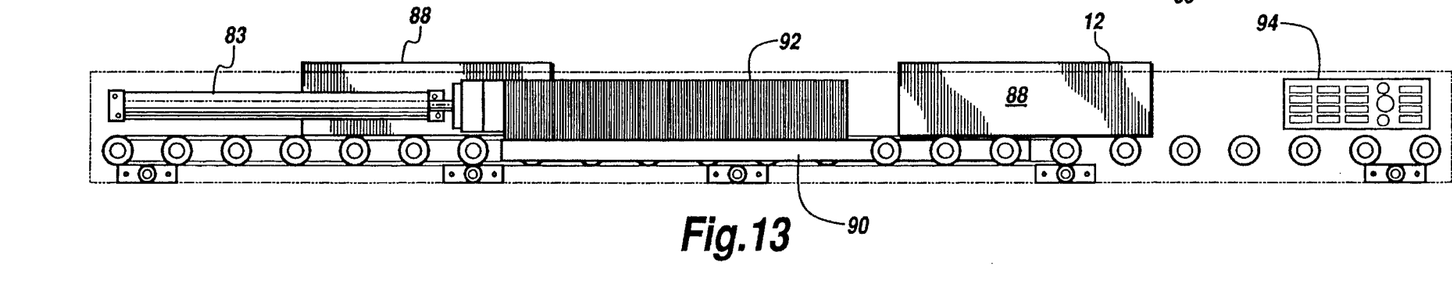
FIG. 13 is a lateral view of a divert section of FIG. 12 in which the divert arm is unactuated and positioned above the side rail.

Referring now to FIG. 12 (a top view), and FIG. 13 (a lateral view), of the divert section 81 in which the divert arm 92 is unactuated and remains positioned along the side rail 85. A product unit 88 passing along the conveyor continues in a straight line, as though the section were a straight modular section.

Figure 14:
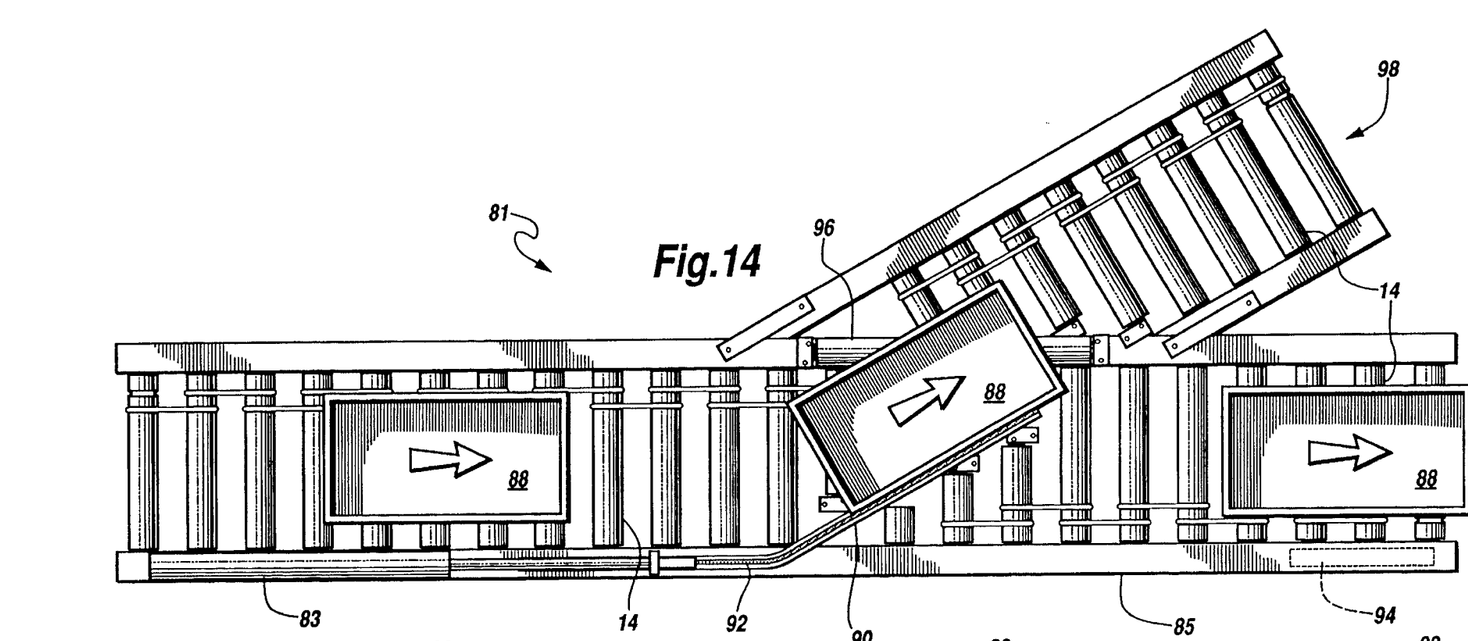
FIG. 14 is atop view of a divert section in which the divert arm is actuated and extends from the side rail into the path of the product unit moving along the conveyor.
Figure 15:
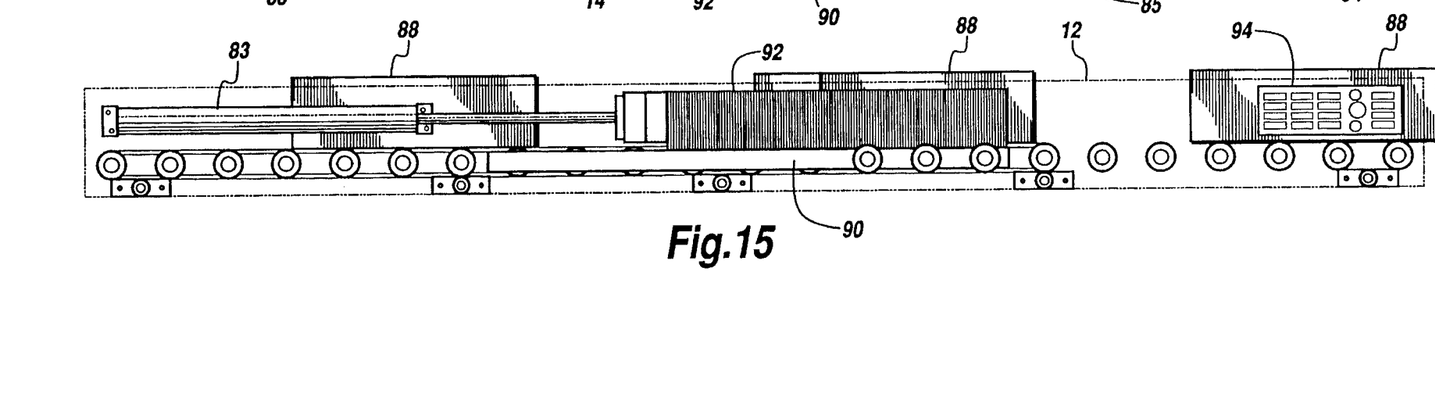
FIG. 15 a lateral view of a divert section of FIGURE 4 in which the divert arm is actuated and extends from the side rail into the path of the product unit moving along the conveyor.

Referring now to FIG. 14 (a top view), and FIG. 15 (a lateral view), of the divert section 81 the divert arm 92 is actuated and extends from the side rail 85 into the path of the product unit 88 moving along the conveyor. The product unit is diverted into the side path 98.

Figure 17:
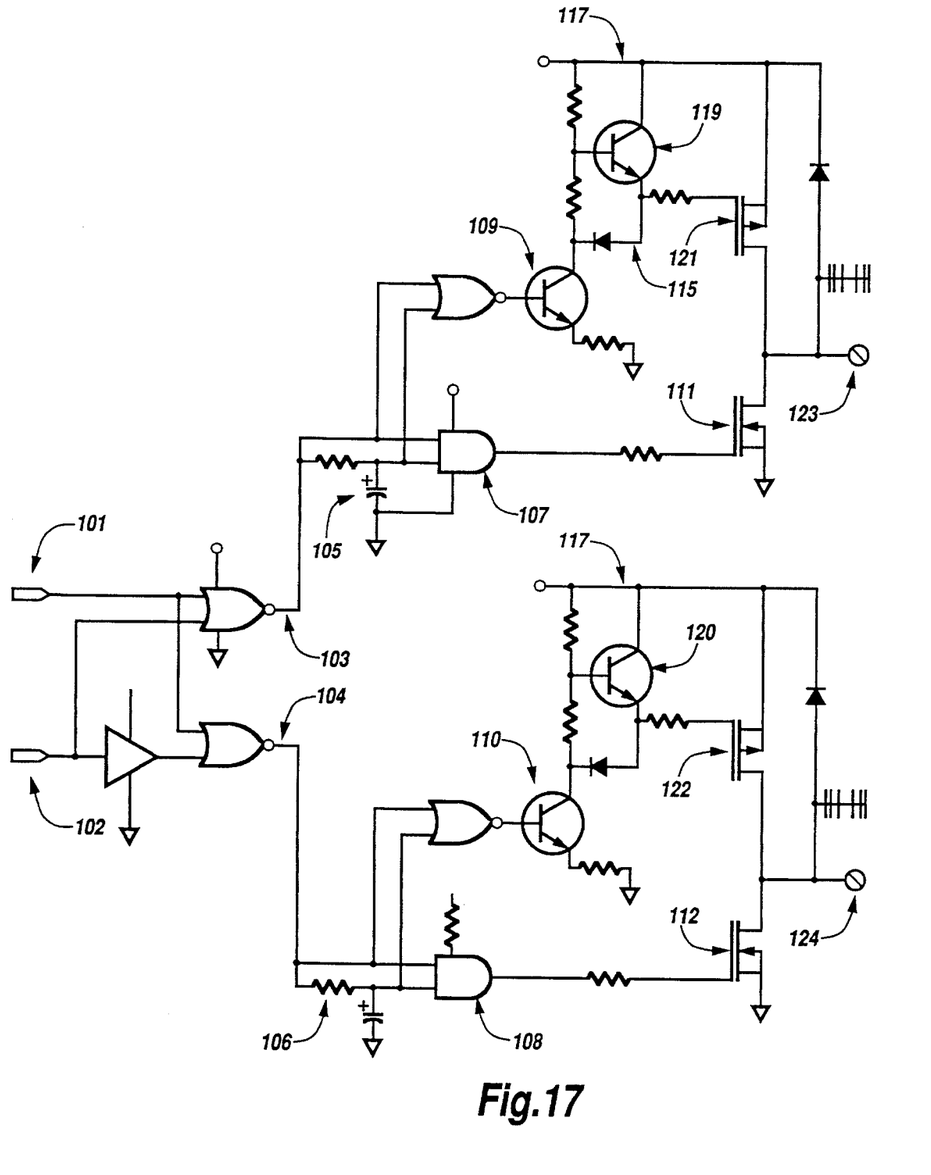
FIG. 17 is a schematic of a logic circuit within the controller.

Referring now to FIG. 16, there is shown a schematic of a preferred implementation of the controller. One such controller appears on each conveyor module. A FLASH-RAM 139 (manufacture designation AT29C256) stores ladder logic code as the computer program for the module. A logic network 137, for example a PSD311 44-pin chip, includes internal logic to interface with a microprocessor 134. The logic network 137 contains a SRAM interconnected to the microprocessor 134; an EPROM; and other logic and switching circuits. The microprocessor 134 controls circuitry associated with the module. A logic network 138, for example a DS1232, restarts the microprocessor 134 in the event of microprocessor interruption. Two logic networks 141, for example HCPL-2400 chips, serve as optical isolators for a serial port, protecting the microprocessor 134 from voltage surges. A networking interface connects a transorb 136 to the microprocessor 134. The transorb 136 clips any voltage above 12 volts, sending it to ground. A high-speed one-meg serial port 130 allows the microprocessor 134 to communicate with the logic networks 141 of an interconnected module. A port 140 allows modification and installation of logic code into the FLASH-RAM 139 by a system installer when the site is initially configured. The inputs of four circuits of the type generally shown in FIG. 17 are collectively made available through terminals 132 to the microprocessor 134. One controller of the type generally shown in FIG. 16 is mounted on each module, as described above, and measures 8"×6"×2". Eight digital inputs at terminals 132 connect to the input pins of the microprocessor 134 through light emitting diodes (LED's) 133 connected to the input terminals 132, these terminals also allow controller diagnostics. Sensor signals at terminals 135 from each of several photosensors also serve as inputs to the microprocessor 134. In the preferred embodiment, the controller operates from a 24 volt AC source, and the interconnected controllers of various modules operate in DEVICE NET and SDS. The controllers communicate on DEVICE NET or on SDS application layers.

Referring now to FIG. 17, there is illustrated a schematic of a logic circuit allowing the controller to alter direction of motion of items on the module, and to enable dynamic braking. Four circuits functionally equivalent to the circuit shown in FIG. 17 reside on each module. One input 101 controls dynamic braking; when the value of the input 101 is zero, dynamic braking is engaged, and the motor driving all rollers associated with the module are stopped. The input 101 is applied to the input to each of two NOR gates 103 and 104, forcing the outputs of the NOR gates 103 and 104 to zero whenever input 101 has a value of one. The output of the NOR gates 103 and 104 passes through a resistor-capacitor debouncer 105 or 106 and through an AND gate isolator 107 or 108, and finally through a resistor, to a JFET 111 or 112. Thus, when input 101 has a value of one, the output of the NOR gates 103 and 104 is zero and the JFETs 111 and 112 close, driving the outputs 123 and 124 to ground. This prevents power from reaching the outputs 123 or 124. On the other hand, when input 101 is zero, the outputs are enabled.

The inverter associated with input 102 ensures that one and only one of the two initial NOR gates 103 or 104 will carry a double-zero input, allowing an output 103 or 104 of the NOR gates to be zero. Thus, input 102 selects which portion of the circuit to energize. This zero value will be passed through the debouncer 105 or 106 and the AND gate 107 or 108, keeping the JFET 111 or 112 open; the output 123 or 124 will not be grounded. The " zero" output from the initial NOR gate 103 or 104 is inverted to a " one" as it passes through the final NOR gate 109 or 110, providing a non-zero signal that is amplified by the cascaded transistors 109, 119, 110 and 120 to a rail voltage 117 of 30 volts. The high voltage closes the output JFET 121 or 122 and connects the output 123 or 124 to the 30-volt rail voltage 117, powering a motor. Input 102 controls the direction of the rollers; the top half of FIG. 17, if energized, drive the motor in one direction, and the bottom half drives the motor in the other direction, as controlled by an inverter; only one portion of the circuit will operate at any given time. The circuit as shown in FIG. 17 shows only two inputs, but because four such circuits appear on any given module, eight inputs are supplied to the microprocessor (shown in FIG. 16).

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A modular power roller conveyor system, comprising:
   a plurality of conveyor sections having at least one selectively actuable active zone for transporting a product unit, each conveyor section including:
   a sensor in each active zone of a section for sensing entry of the product unit into the respective active zone and for generating a detection signal in response thereto;
   a programmable controller responsive to the detection signal from the sensor for each active zone for generating a control signal to selectively actuate an active zone as the product unit enters the zone and for generating a control signal to deactivate the active zone as the product unit exits the zone; and
   a hollow side rail housing having a wireway with an opening thereto and a removable cover for the opening to allow access to the wireway, said side rail housing including a channel for internally supporting the programmable controller, sensors, and interconnecting wiring.

2. The modular power roller conveyor system of claim 1 wherein each of the plurality of active zones includes:
   a drive roller responsive to the control signal of the programmable controller;
   a plurality of carrier rollers; and
   means for connecting the drive roller to each of the plurality of carrier rollers such that actuation of the drive roller actuates each of the plurality of carrier rollers.

3. The modular power roller conveyor system of claim 1 wherein the sensor includes a photosensor individually positioned to detect the entrance of the product unit into the respective active zone.

4. The modular power roller conveyor of claim 1 wherein at least one of the conveyor sections defines a curved pathway.

5. A modular power roller conveyor system of a plurality of conveyor sections, comprising:
   each conveyor section having at least one selectively actuable active zone for transporting a product unit, each active zone comprising:
   a drive roller;
   a plurality of carrier rollers; and
   means for connecting the drive roller to each of the plurality of carrier rollers such that actuation of the drive roller actuates each of the plurality of carrier rollers;
   a photosensor for sensing entry of the product unit into the active zone and for generating a detection signal in response thereto; and
   each conveyor section further including a programmable controller responsive to the detection signal from each active zone for generating a control signal to selectively actuate the drive roller within an active zone as the product unit enters the zone and for generating a control signal to selectively deactuate the drive roller within the active zone as the product unit exits the zone; and
   a hollow side rail housing having a wireway with an opening thereto and a removable cover for the opening to allow access to the wireway, said housing supporting the drive roller and the plurality of carrier rollers, said side rail housing including a channel for internally supporting the programmable controller, photosensors, and interconnecting wiring.

6. The power roller modular conveyor system of claim 5 further including means for electrically connecting one conveyor section to other conveyor sections to interconnect the programmable controller of adjacent sections.

7. The power roller modular conveyor system of claim 5 further including means for mechanically interconnecting one conveyor section to an adjacent conveyor sections.

8. The power roller modular conveyor system of claim 5 wherein at least one of the conveyor sections defines a curved pathway.

9. A modular power roller conveyor system comprising:
   at least one straight conveyor section having a plurality of selectively actuable active zones for transporting a product unit, each straight conveyor section including:
   a sensor in each active zone of a section for sensing entry of the product unit into the respective active zone and for generating a detection signal in response thereto; and
   a programmable controller responsive to the detection signal from the sensors for each active zone for generating a control signal to selectively actuate an active zone as the product unit enters the zone and for generating a control signal to deactivate the active zone as the product unit exits the zone; and
   at least one curved conveyor section having a plurality of selectively actuable active zones for transporting a product unit, each curved conveyor section including:
   a sensor in each active zone of a section for sensing entry of the product unit into the respective active zone and for generating a detection signal in response thereto; and
   a programmable controller responsive to the detection signal from the sensors for each active zone for generating a control signal to selectively actuate an active zone as the product unit enters the zone and for generating a control signal to deactuate the active zone as the product unit exits the zone; and
   each straight conveyor section and each curved conveyor section including a hollow side rail housing having a wireway with an opening thereto and a removable cover for the opening to allow access to the wireway, said side rail housing including a channel for internally supporting the programmable controller, sensors, and interconnecting wiring.

10. The modular power roller conveyor system of claim 9, wherein each of the straight and curved conveyor sections includes:

a drive roller responsive to the control signal of the programmable controller;

a plurality of carrier rollers; and means for connecting the drive roller to the plurality of carrier rollers such that actuation of the drive roller actuates each of the plurality of carrier rollers.

11. The modular power roller conveyor system of claim 9, wherein each of the sensors includes photosensors positioned to detect the entrance of the product unit into a respective active zone.

12. A modular power roller conveyor system comprising:

at least one divert section having at least one selectively actuable active zone for transporting a product unit along a selective path, each divert section including:

a sensor in each active zone of a section for sensing entry of the product unit into the respective active zone and for generating a detection signal in response thereto;

means for diverting a product from a first direction to a second direction; and a programmable controller responsive to the detection signal from the sensor for each active zone for generating a control signal to selectively actuate an active zone and the means for diverting as a product unit enters a zone and for generating a control signal to deactuate the active zone and the means for diverting as the product unit exits the zone; and a hollow side rail housing having a wireway with an opening thereto and a removable cover for the opening to allow access to the wireway, said housing supporting the programmable controller, sensors, and interconnecting wiring.

13. The power roller modular conveyor system of claim 12 wherein the hollow side rail housing includes:

an opening at each zone; and means for mounting the sensor for each active zone in the housing at one of the openings therein.

* * * * *

UNITED STATES PATENT AND TRADEMARK OFFICE
CERTIFICATE OF CORRECTION

PATENT NO. : 5,582,286
DATED : December 10, 1996
INVENTOR(S) : W. Scott Kalm, et al.

It is certified that error appears in the above-indentified patent and that said Letters Patent is hereby corrected as shown below:

Column 1, line 58, "Units", should be --units--.

Column 2, line 46, "FIGURE 4", should be --FIGURE 14--.

Column 3, line 39, "Surface", should be --surface--.

Column 4, line 22, "50Ωas, should be --50Ω as--.

Signed and Sealed this

Twenty-ninth Day of April, 1997

Attest:

BRUCE LEHMAN

*Attesting Officer*     Commissioner of Patents and Trademarks